United States Patent [19]

Matsunaga

[11] 3,829,589

[45] Aug. 13, 1974

[54] METHOD OF MAKING PEANUT FLOUR

[76] Inventor: Akihiro Matsunaga, 32-4, Higashi-Ikebukuro, 2-Chome Toshima-ku, Tokyo, Japan

[22] Filed: Oct. 24, 1972

[21] Appl. No.: 299,733

[52] U.S. Cl.............. 426/427, 426/148, 426/443, 426/465, 426/471, 426/473
[51] Int. Cl............................................. A21d 6/00
[58] Field of Search........ 99/93, 126; 426/148, 443, 426/427

[56] References Cited
UNITED STATES PATENTS

| | | | |
|---|---|---|---|
| 617,266 | 1/1899 | Watson | 99/126 |
| 2,128,850 | 8/1938 | Richards | 99/126 |
| 3,697,286 | 10/1972 | Grün | 99/93 X |

OTHER PUBLICATIONS

Harris et al., Bulletin 431, April 1972, Agricultural Experiment Station, Auburn Uni. Auburn, Ala., Pages 8–11, 14, 16, 17, 30–35.

Primary Examiner—Raymond N. Jones
Attorney, Agent, or Firm—Irons, Sears & Santorelli

[57] ABSTRACT

Improved free-flowing peanut flour, free of objectionable peanut odor and from which impurities including tannin have been removed, is produced by a process including the steps of gently parching shelled peanuts at a temperature of 50° to 90°C. for 3 to 6 minutes, soaking the peanuts in a saline solution for approximately 30 seconds to 5 minutes at a temperature of about 20° to 50°C., heat treating the peanuts in water at a temperature of 100° to 120°C. for 15 to 45 minutes, washing the peanuts in water, heat treating again in water at a temperature of 100°C., and then compressing and pulverizing the peanuts to micronized form so as to pass through a 300 mesh screen and spray drying the micronized peanuts to an off-white, free-flowing peanut flour free of impurities and objectionable odors.

In one example, 1 kilogram of peanuts are parched at 80°C. for 4 minutes, soaked in 2 liters of saturated saline solution at 120°C. for 1 minute, heat treated in 1.5 liters of water at 100°C. for 20 minutes, washed, heat treated in 2 liters of water at 90°C. for 30 minutes, and then compressed, micronized, and the flour obtained spray dried to obtain a free-flowing, off-white peanut flour.

13 Claims, No Drawings

METHOD OF MAKING PEANUT FLOUR

BACKGROUND OF THE INVENTION

This invention concerns improved flour manufactured from peanuts and a new process for making such flour.

It is well known that peanuts are very high in nutritive food value, and besides the well known practices of consuming peanuts whole, in candies, peanut butter, and the like, peanuts in the form of flour can be consumed directly as a nutritive substance when suspended in water or milk products, either plain or flavored. Peanut flour has been used as an enriching component in many different foods, particularly in underdeveloped countries.

Typically, peanuts are comprised of approximately 3 to 4 percent water, 45 to 48 percent raw fat, 0.5 to 1 percent raw fiber, 30 to 32 percent protein, 15 to 16 percent soluble non-nitrogeneous substances, and 2 to 2.5 percent ash in the form of phosphoric acid and alkali. The composition will, of course, vary somewhat depending on the geographic source of the peanuts, such as Nigeria or Virginia.

It is thus clear that the peanuts are high in nutritive value. When processed in the form of flour, they can be utilized to enhance the food value of many edible substances.

One of the difficulties which has been encountered in processing peanuts to flour form is the difficulty of removing tannin and other impurities, as well as the inherent odor of peanuts which is objectionable for many applications. In addition, difficulty has been encountered in pulverizing the peanuts to a free-flowing white flour.

While various processes are known for accomplishing these ends, they are extremely expensive and/or have an adverse effect on the fats and proteins in the peanuts, tending to partially degradate them, causing a change in the taste or making pulverization of the peanuts into flour form difficult. Changes in the fat composition which constitutes a major portion of the components of peanuts has been a major problem.

SUMMARY OF THE INVENTION

According to the present invention, an improved peanut flour is provided which is odorless, substantially free of tannin and other common impurities previously encountered in peanuts, and is a very faint tan to white in color. Peanuts treated according to this invention can be micronized into a very fine free-flowing flour powder. The peanut flour of the present invention is high in nutritive value and very tasty.

The process of the present invention, while removing the odor, tannin and impurities, and facilitating the pulverization of peanuts into a fine, free-flowing powder, does not deteriorate any of the protein or fat constituents of the peanuts to alter the inherent flavor of the peanuts.

The process by which the improved peanut flour of the present invention is produced comprises first gently parching the shelled peanuts for a short period of time in dry heat to facilitate removal of the thin skin, removing the skins in a conventional de-skinning operation, and then soaking the peanuts in a substantially saturated saline solution at a temperature of from 20° to 50° C. for approximately 30 seconds to 5 minutes.

The peanuts are then removed from the saline solution and then heat treated in water under pressure at a temperature of 100° to 120° C. for approximately 15 to 45 minutes. Preferably, the heat treatment is repeated again after washing the peanuts in clear water, the second heat treatment being conducted at 100° C. or slightly lower temperature.

The peanuts are then pulverized to a liquid state so that they pass through a 300 mesh screen, and the fluid composition is then spray dried by conventional methods to obtain an odor-free, substantially impurity-free, off-white, free-flowing peanut flour.

It is important in the parching treatment which serves to facilitate removing the skin of the peanuts that they not be scorched. It is generally preferred that the peanuts be parched for about 3 to 6 minutes at a temperature of 50° to 90° C.

The preferred temperature for soaking the peanuts in the saline solution is from 30° to 40° C. If the temperature is too low, the full effect of the steeping treatment is not obtained, while at exceedingly higher temperatures, part of the protein content of the peanut is dissolved which alters the food value and taste of the peanut.

The steeping treatment serves to remove the tannin, mold, soil bacteria, and other common impurities present in the peanuts, and most especially serves to remove the objectionable odor which is associated with peanuts. Since during the treatment the peanuts are floated in a saline solution, other gross impurities such as sand, gravel, insect parts, and the like are further removed. I have also found that the steeping or soaking treatment facilitates the subsequent pulverization of the peanuts into the free-flowing flour. In the saline soak step, it is preferred that approximately 1 kilogram of peanuts be treated in approximately 1 to 5 liters of the saline solution, with the most preferred ratio being 1 kilogram of peanuts in 2 liters of solution.

In an alternative embodiment of the process of this invention, the peanuts are treated in an alkaline solution prior to the saline soaking step. In this embodiment, the peanuts are soaked in a 0.6 to 1 percent solution of caustic soda for about 2 to 5 minutes, which is followed by washing with water and then the saline soak as indicated.

A further alternative embodiment is that following saline soaking step, the peanuts can be dried or parched at a temperature of 80° to 100° C. for 15 to 25 minutes. This additional parching treatment seems to enhance the effects of the subsequent heat treatment in the water and enhances the inherent savoriness of the peanuts.

As indicated, following the heat treatment, the peanuts are micronized to a maximum size which will pass through a 300 mesh screen or finer and then the fluid peanut mud is spray dried by conventional methods producing a fine off-white peanut flour which is odor-free and substantially free of the common impurities in peanuts. The peanut flour obtained according to this invention has none of the protein or fat constituents altered deleteriously. The full nutrient value of the peanuts is substantially maintained. The peanut flour obtained by the process of the present invention can be added to various drinks such as water-based drinks and milk with or without the addition of sugar to form a highly concentrated food. In addition, the flour can be added to many other food products to greatly enhance their nutritive value and impart its unique flavor to the products.

The wet heat treatment serves to remove any caustic and salt which has been absorbed into the peanuts as a result of the previous steeping treatments in the saline or alkali solutions as well as fully removing the tannin, odor, etc. The heat treatment also is extremely important for facilitating the proper pulverization of the peanuts. During the heat treatment, approximately 1 to 5 liters of water are employed per kilogram of peanuts with 1.5 to 2 liters of water being preferred, although this is apparently not critical.

DESCRIPTION OF PREFERRED EMBODIMENTS

The following examples will further serve to illustrate the nature of my invention. In each of the following example, the peanuts utilized have been shelled and initially parched to remove the thin skins by heating them for from 3 to 6 minutes at temperatures ranging from 50° to 90° C., and treating them in a skinning machine.

EXAMPLE 1

One kilogram of peanuts from which the thin skins have been removed following the parching treatment at 80° C. for 4 minutes are soaked in 2 liters of a saturated saline solution at a temperature of 30° C. for approximately 1 minute. The peanuts are then heat treated in 1.5 liters of water at a temperature of 100° C. for 20 minutes. The peanuts are then washed with water and placed in 2 liters of water at 90° C. for approximately 30 minutes. The fluid suspension of peanuts is then compressed and pulverized in the mud state and the peanuts micronized. The fluid thus obtained is spray dried by conventional methods to obtain a peanut flour which passes through a 300 mesh screen. The flour obtained is off-white, completely free of objectionable odor, and is very tasty, free of any objectionable taste due to alteration of the protein or fat contents.

EXAMPLE 2

Following the parching treatment described above, 1 kilogram of peanuts is placed in 3 liters of a saturated saline solution for about 1 minute at a temperature of about 40° C. The peanuts are then removed, and subjected to a parching treatment at 90° C. for approximately 18 minutes. The peanuts are then added to 1.5 liters of water and heat treated in the water at a temperature of 50° C. for approximately 20 minutes. The peanuts are again washed with water and then placed in 1.5 liters of fresh water and heat treated at a temperature of 50° C. for 20 minutes. The peanuts are again washed and then placed in 1.5 liters of fresh water and heat treated in an autoclave at 120° C. for approximately 30 minutes.

The peanuts obtained are compressed and pulverized to the mud state, ground and milled to obtain a fluid of micronized peanuts. The fluid is the spray dried. The flour obtained has a slightly yellowish-brown cast, is completely free of peanut's inherent odor, and is a free-flowing flour.

EXAMPLE 3

Five hundred kilograms of peanuts of uniform size are parched at a temperature of 90° C. for about 2 minutes. Thereafter they are steeped in 1,000 liters of a 0.8 percent solution of caustic soda for 3 minutes. The peanuts are then washed with water and added to 1,000 liters of a saturated saline solution and soaked at 50° C. for 4 minutes. The peanuts are removed from the saline solution and placed in an autoclave with 1,000 liters of water and heat treated for 7 minutes at a temperature of 120° C. The peanuts are removed and washed with water. Following the washing, the peanuts are subjected to a second heat treatment for 7 minutes at a temperature of 120° C. in 1,000 liters of water. The peanuts are then compressed, pulverized, and milled. To the fluid micronized peanuts there is added 1,000 liters of a 70 percent solution of dextrine to homogenize the peanuts, and the homogenized liquid is spray dried to obtain a free-flowing peanut flour.

While the invention has been explained by a detailed description of certain specific embodiments, it is understood that various modifications and substitutions can be made in any of them within the scope of the appended claims which are intended also to include equivalents of such embodiments.

What is claimed is:

1. A process for the manufacture of peanut flour comprising treating skinned peanuts in a substantially saturated saline solution at a temperature and for a time sufficient to remove tannin and the odor associated with peanuts, thereafter heat treating said peanuts in water at a temperature of 100° C. or above to remove any salt absorbed from the initial treating step, pulverizing said peanuts to a liquid state so that they pass through a 300 mesh screen and spray drying the peanuts to thereby obtain a free-flowing peanut flour.

2. A process as claimed in claim 1 wherein said heat treatment step is carried out at a temperature of 100° to 120° C.

3. A process as claimed in claim 2 wherein said peanuts are soaked in said saline solution for about 0.5 to 5 minutes.

4. A process as claimed in claim 2 wherein said peanuts are soaked in said saline solution at a temperature of about 20° C. to about 50° C.

5. A process as claimed in claim 4 wherein said peanuts are soaked in said saline solution for about 0.5 to 5 minutes.

6. A process as claimed in claim 2 wherein said peanuts are heat treated in water for 15 to 45 minutes.

7. A process for the manufacture of peanut flour comprising soaking skinned peanuts in a saline solution at a temperature of 20° to 50° C. for 0.5 to 5 minutes, thereafter heat treating said peanuts at a temperature from about 100° to 120° C. for 15 to 45 minutes, pulverizing said peanuts to a liquid state so that they pass through a 300 mesh screen and spray drying the peanuts to thereby obtain a free-flowing peanut flour.

8. A process as claimed in claim 7 wherein said peanuts are first parched at a temperature of 80° to 100° C. for 15 to 25 minutes and thereafter de-skinned.

9. A process as claimed in claim 7 wherein after de-skinning said peanuts, they are soaked in a 0.6 to 1 percent solution of caustic soda for about 2 to 5 minutes, washed and then soaked in the saline solution.

10. A process as claimed in claim 7 wherein following the heat treatment at 100° to 120° C., said peanuts are washed and thereafter heat treated at a temperature of 100° C. or slightly less for 15 to 45 minutes.

11. A process as claimed in claim 7 wherein for each kilogram of peanuts, 1 to 5 liters of saline solution is employed and in the heat treating steps, 1 to 5 liters of water are employed.

12. A process as claimed in claim 7 wherein for each kilogram of peanuts approximately 2 liters of saline solution is employed, and during the heat treating steps, approximately 2 liters of water per kilogram of peanuts is employed.

13. A process as claimed in claim 7 wherein following the wet heat treating step, the peanuts are parched at 80° to 100° C. for 15 to 25 minutes.

* * * * *